Jan. 8, 1963　　　　J. W. DODSWORTH　　　　3,072,329
CONTROL FOR MOTOR OPERATED BUSINESS MACHINES
Filed June 30, 1960　　　　　　　　　　　　8 Sheets-Sheet 1

INVENTOR.
JAMES W. DODSWORTH

AGENT

INVENTOR.
JAMES W. DODSWORTH
BY
AGENT

Jan. 8, 1963  J. W. DODSWORTH  3,072,329
CONTROL FOR MOTOR OPERATED BUSINESS MACHINES
Filed June 30, 1960  8 Sheets-Sheet 4

INVENTOR.
JAMES W. DODSWORTH
BY Elmer W. Edwards
AGENT

INVENTOR.
JAMES W. DODSWORTH
BY
AGENT

INVENTOR.
JAMES W. DODSWORTH

BY Elmer W. Edwards

AGENT

United States Patent Office 3,072,329
Patented Jan. 8, 1963

3,072,329
CONTROL FOR MOTOR OPERATED BUSINESS MACHINES
James W. Dodsworth, Mount Tabor, N.J., assignor to Monroe Calculating Machine Company, Orange, N.J., a corporation of Delaware
Filed June 30, 1960, Ser. No. 40,073
13 Claims. (Cl. 235—62)

The present invention relates to business machines such as computing machines, calculating machines, and so forth, of the type wherein manipulation of selective ones of a plurality of function control keys will cause an operation of power driven main operating mechanism for one or more machine cycles. More particularly the invention has relation to a means adapted for effecting universal continuous control of interlock devices therefor throughout any sequence of cyclic and extra cyclic operations of such machines.

As is known in the art, function keys generally control a number of mechanisms which are required to accomplish certain movements upon manipulation of said keys whereby to determine the particular functions associated with the selected keys, start a machine cycle of operation and to adjust various interlock means against the misoperation of any other key until the operation pertaining to the selected key is completed. Sometimes it is difficult to accomplish all the said movements within one single machine cycle. Therefore, two or more consecutive machine cycles may be allotted to certain function keys. This is the case, as for instance, of the total keys of some conventional listing computing machines. As also well known to the art, certain functions of such machines, such as a successive zeroizing operations of certain well-known crawl carry type registers, record carriage tabulation, etc. are usually operable through spring actuated servo-mechanisms which operate extra cyclic to the main cyclic devices of the machine. Independent clutch means adapted for effecting a motor power operated program selection of the registers and releasable for an operation automatically in a movement of the record carriage and alternatively by a manually settable control means may also be provided, such as fully set forth in U.S. Patent 2,756,926 issued July 31, 1956 to the present inventor.

In machines of the type set forth in said patent, and for which the present invention contemplates an improvement in means for controlling interlocking devices therefor, a complete machine operation wherein to effect each entry within any selected ones of the registers may, upon an operation of any selected control key for releasing the main cyclic clutch devices, include a main cycle of machine operation, an automatic carriage shifting operation at the conclusion of said main cycle of operation and thereafter at the conclusion of the carriage shifting operation an automatic release of a register selecting clutch adapted for causing a cycle of operation of the register program selecting means wherein to recondition the registers preparatory to a next subsequent entry to be made on the machine. For totalizing operations the sequence of operations would be similar, with the exception that more than one machine cycle may be utilized, in which case the carriage shifting operation must be held in abeyance until a completion of the final cycle of such operations. Also wherein crawl carry type registers may be used such registers are first tripped and successively zeroized under spring motor power prior to the starting of a machine cycle of operation, as in well-known manner.

In addition to the common motor control keys, such as the usual plus, minus and total taking keys, machines of the above character may include also a nontabulating key and other manually operated special control keys, one such being the "Vertical Total" key disclosed in the above Patent 2,756,926, which key upon operation serves not only to immediately trip the register selection program clutch means but will also set certain control means for the purpose of modifying a regular register selection program so as to accord with such a Vertical Total operation. At the same time, operation of the "Vertical Total" lever serves also to condition suitable control means which act subsequently to automatically trip the total taking devices at the conclusion of any "Vertical Total" register selection cycle.

For delaying in turn any subsequent one of the operations until the preceding operation of such a series is completed various interlocks are provided as fully set forth in the above patent. Such interlocks heretofore however are rendered effective coincident with a release of the main clutch in the depression of one of the operating control keys and thereafter is rendered ineffective again near the end of the main clutch cycled operation along with an automatic restoral of the operating key.

It has been found that in machines utilizing servomechanisms which operate precyclic to the main cycle of machine operation for certain operations, such as for total taking, a sufficient time is made available so that a normally fast operator is very apt inadvertently to prematurely adjust certain control keys for releasing other devices operating extra cyclic to the main clutch means. Under such a circumstance as where a series of sequential operations are involved it may occur that as an incident to the operation of a selected control key certain extra cyclically operable devices may be set in motion simultaneously with an operation of other such devices as released for operation automatically at the conclusion of an operation of the main cyclic devices, in which case a conflict may occur within the mechanisms and thus cause a confusion or jamming and possible damage to the parts.

An object of the present invention is the provision of novel interlock control devices including a centrifugally operable slip clutch adapted to prevent such premature misoperation of any such manually operated machine control devices, and wherein the said interlock control devices are adjusted automatically to an active locking condition by any motor operation prior to a start of the operation of any machine cyclic means by the said motor.

As another object the invention provides centrifugally operable control means whereby the said interlock devices are maintained in an active control condition for a time period subsequent to a completion of any operation of said motor operated cyclic devices and will thereby serve to prevent a premature operation of certain manually selectable machine control devices.

Another object of the invention includes the provision of means wherein the said interlock devices are released automatically following a period of time immediately subsequent to a completion of any operation of the motor operated devices.

Another object of the invention is the provision of novel means for automatically effecting extra cyclic motor power operations of the said interlock devices without increasing either the extent or number of any machine cycles of operations.

Other objects of the invention will be pointed out in the following description and claims and illustrated in the accompanying drawings, which disclose, by way of example, the principle of the invention and the best mode, which has been contemplated, of applying that principle.

In General

Figure 1:
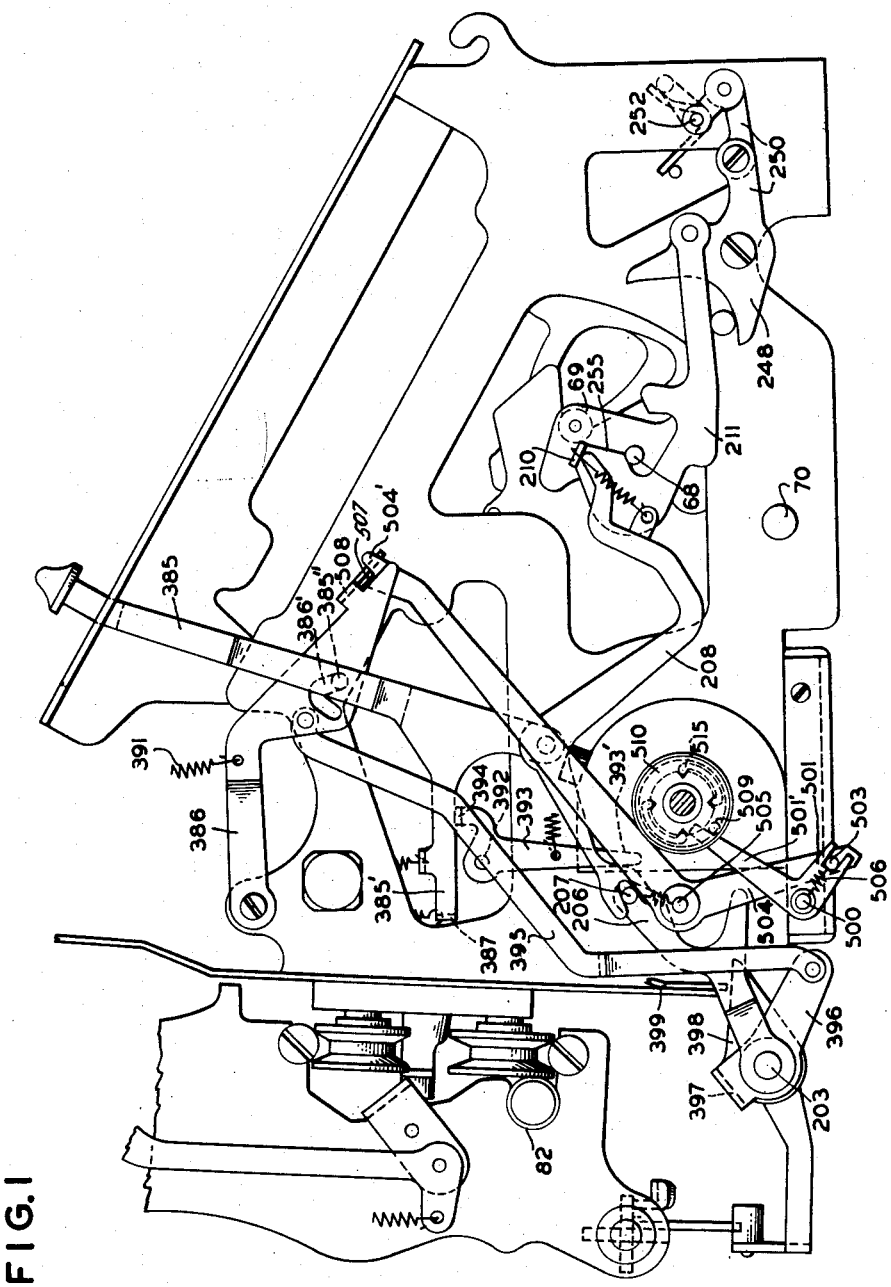
FIG. 1 is a left side elevation of a machine embodying the invention, showing the vertical total lever with the parts operated thereby, and the interlock control means for said lever.

The adding listing machine to which the invention is shown as applied is of well-known type illustrated in the above referred to U.S. Patent 2,756,926 to the present inventor. Reference is also made to U.S. Patent No. 1,946,572 issued February 13, 1934, No. 2,070,785 issued Feb. 16, 1937 and to U.S. Patent No. 2,134,280 issued Oct. 25, 1938, all to Loring P. Crosman, for further details of parts and operations of certain mechanisms utilized by this invention but not herein described in detail. It will be sufficient therefore to describe the machine proper very generally and to say that for each denominational order the machine is provided with a three armed differential actuator lever numbered 610 (FIG. 3) loosely mounted on a shaft 608. The forward arm of each lever 610 terminates in a segmental registering rack; the rearward arm has a lister type bar 611 pivoted thereto, and the upper arm has pivotal connection with a differential stop bar 615 cooperating with a bank of digit keys 215 to limit the movement of the lever 610.

The digit keys are depressible to represent a value and when depressed are latched in position with the bottoms of their stems lying in the path of movement of the related stop lugs of the bars 615, and allow such bars to advance a distance proportionate to the value of the depressed key, upon operation of the machine. Depression of a digit key will also remove a column latch 214 from the path of movement of its related bar 615, which latches prevent movement of a stop bar 615 and lever 610 in any column in which no key is depressed.

A rock shaft 301 is provided with cam means 318 for governing the movement of a spring tensioned rocker frame 616, carrying a series of dogs 617, normally engaged by stud 659 of the lever 610. As shaft 301 is rotated forwardly (counterclockwise in FIG. 3) frame 616 will be rocked about shaft 608, and any of the levers 610 which have been released by depression of digit keys 215 will be allowed to rotate, under the influence of their spring 683, until they are stopped by the lugs of bar 615, contacting with the stems of the keys. Upon rearward (return) rotation of shaft 301, the dogs 617 will return the operated levers 610 to normal position. This excursion of levers 610 serves to register amounts set in the keyboard upon one or more accumulators and to set up a similar amount on the printing line of the type bars.

Shaft 301 is oscillated by an electric motor 48, connected through suitable gearing and clutch means, with a crank arm 155 (FIG. 4) connected by a rod 161 to an arm 316, fast upon shaft 301, so that as crank arm 155 is rotated, shaft 301 will be oscillated.

Motor operation is normally controlled by motor bars or keys through a clutch lever 150 which cooperates with a roller adapted to close contact members 64 (FIGS. 4, 7) of a switch 65 in the motor circuit, after lever 150 is moved out of restraining engagement with the spring operated clutch. A spring 151 tends to pull lever 150 away from the clutch, the lever being normally held in clutch engaging position by means of a latch 148. Latch 148 is controlled by a trigger 147, lying in the path of movement of a lever arm 138' integral with a motor key 138. Upon depression of key 138 trigger 147 is rocked clockwise to release latch 148 and clutch lever 150 will be pulled out of engagement with the clutch to start the machine in operation.

Upon release of key 138, latch 148 will return under spring action into latching position and, toward the end of the cycle of operation, an arm 155' connected with the crank member 155 will contact a tooth 150' of the clutch lever 150 and will force said lever back into latching position, breaking the electric circuit and bringing the end of lever 150 into the path of movement of the rotating clutch pawl 153 to terminate the cycle.

Means, such as more fully disclosed in U.S. Patent 1,946,572 of reference, are provided for throwing the pinions 472 (FIG. 3) of any accumulators No. 1, No. 2, No. 3, and No. 4 into mesh within the segments 610 either during the forward stroke of said segments, to effect subtractive registration on the accumulators or during return stroke of the segments to effect additive registration thereon. This means, as well known, comprises a series of cams on the register shafts 403 and a series of cooperating cams connected with rocker plates 419 (FIG. 4) so arranged that when the high points of the cams on one shaft register with the high points of the cams connected with the plates 419, the register pinions will be moved into mesh with the segments 610, against the tension of suitable springs. The register shafts being guided in their movements into and out of suitable slotted recesses in a fixed frame plate.

As shown, the two upper accumulators, No. 1 and No. 2 are capable of additive or subtractive registration, while the No. 3 and No. 4 accumulators are designed for addition only. Any of the accumulators may be disabled or adjusted to non-add condition by appropriate location of the cams carried by the shafts 403.

In order that the No. 1 and No. 2 accumulators may be set for addition or subtraction, the shafts 403 of these accumulators are provided with two cams 121 and 122 projecting from the shaft in different angular directions. Thus, rotation of shaft 403 will move the cams 121 out of registering position and the cams 122 into registering position, a further rotation of the shaft moving both cams out of registering position.

Total Talking

As more fully set forth in the patents of reference a total standing in any one of the registers may be cleared therefrom and printed on a record sheet in well-known manner, by engaging the pinions 472 (FIG. 3) of the register with the rack segments 610 and thereafter successively releasing the differential stop bars 615 to allow the segments 610 under influence of their respective springs 683 to rotate the accumulator wheels subtractively until suitable zero stops 457 thereon engage cooperating stops 613, which have been brought into their path of movement. Successive release of the rack levers 610 is essential because of the character of the tens transfer mechanism employed between the accumulator wheels, i.e., the "crawl" carry type, wherein every unit of movement of a lower wheel transmits one tenth of a unit of movement to the next adjacent higher order wheel. Therefore, in zeroizing as each lower order wheel is returned to zero it will subtract from the higher order wheel the fractional movement previously transmitted.

The column latches 214 are lifted free of the stop bars 615 and the rack levers 610 thereafter successively released from the restoring frame 616 upon depression of the total key 278, in the following manner.

Figure 3:
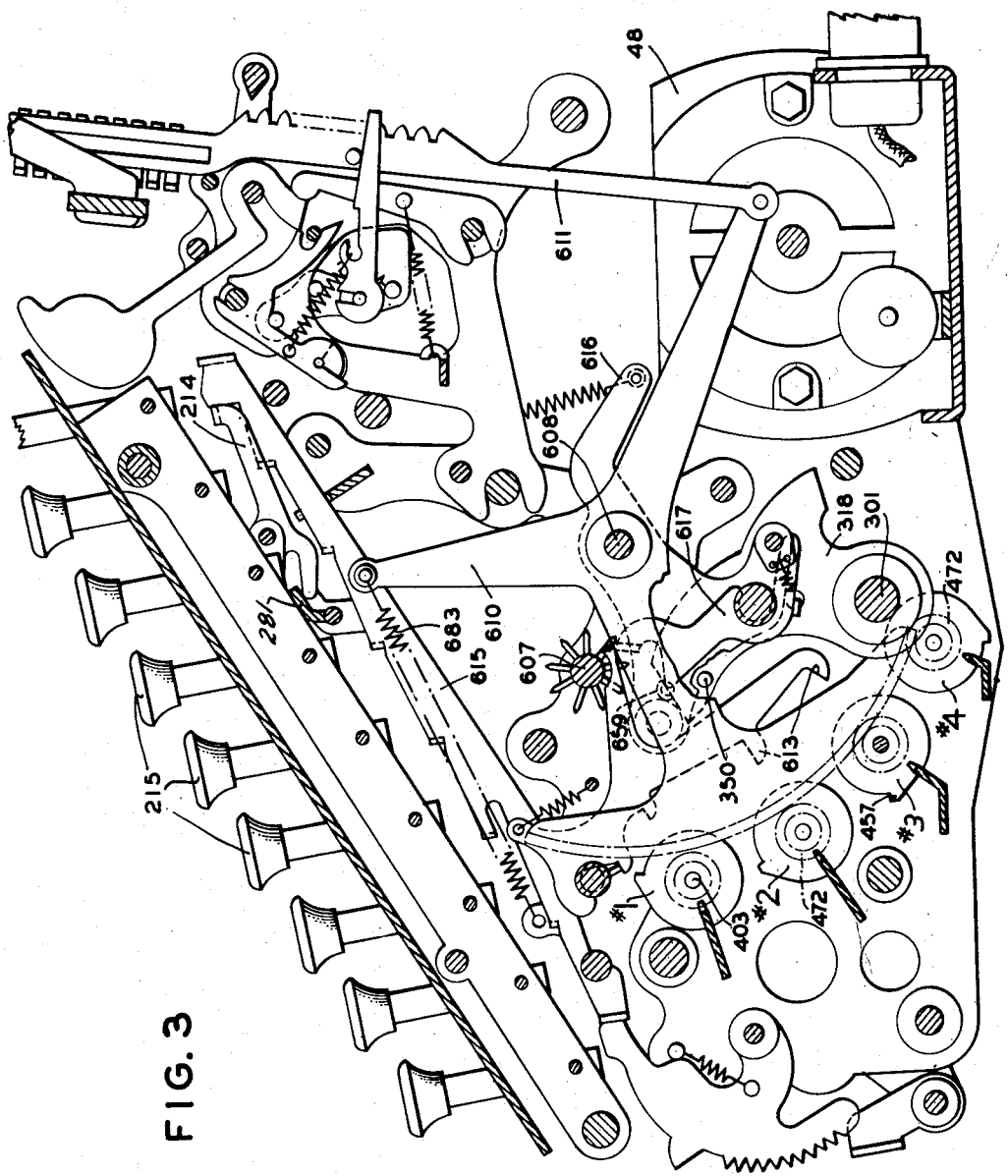
FIG. 3 is a right side elevation showing a cross-section of the keyboard, registering and printing devices.

The rearward end of the total key 278, upon depression of said key will engage a stud 279 (FIG. 5) to impart clockwise movement to a bail 280. Bail 280 is provided with a crossover member 281 overlying the forward end of the column latches 214 and will therefore, when so moved, rock the latches free of the stop bars 615 (FIG. 3).

A shaft 282 (FIG. 5) having its right hand end formed as a crank arm projects over the rearward end of the total key, and is caused to be rocked counterclockwise upon depression of said key.

Secured to shaft 282 is an arm 283 adapted to impart clockwise movement to a latch 620 upon the above described movement of said shaft, by engagement with a pin 284 secured to control arm 621, pivotally mounted upon said latch.

Latch 620 normally engages a lug 627 on total segment 618, preventing movement of said segment under influence of the total spring 631. Upon tripping of the latch, however, segment 618 will be rocked upwardly about its fulcrum point 628 and will impart counterclockwise rotation, through gear 629, to a shaft 607 (FIG. 3). Shaft 607 extends transversely of the machine and is provided with a series of helically arranged pins adapted during rotation of said shaft to trip, successively from right to left, the series of latching dogs 617, mounted upon the frame 616 and engaging pins 659 of the levers 610, as earlier described.

Tripping the dogs 617 will also release spring tensioned stop members 613 permitting said members to move into the path of movement of the zero stops 457 on the accumulator wheels.

As each lever 610 is released, its spring 683 will rotate it until the related accumulator wheel has been rotated reversely to zero, when stop 457 will contact with member 613. The value subtracted from the wheel is now represented by the type lifted to the printing line.

Figure 4:
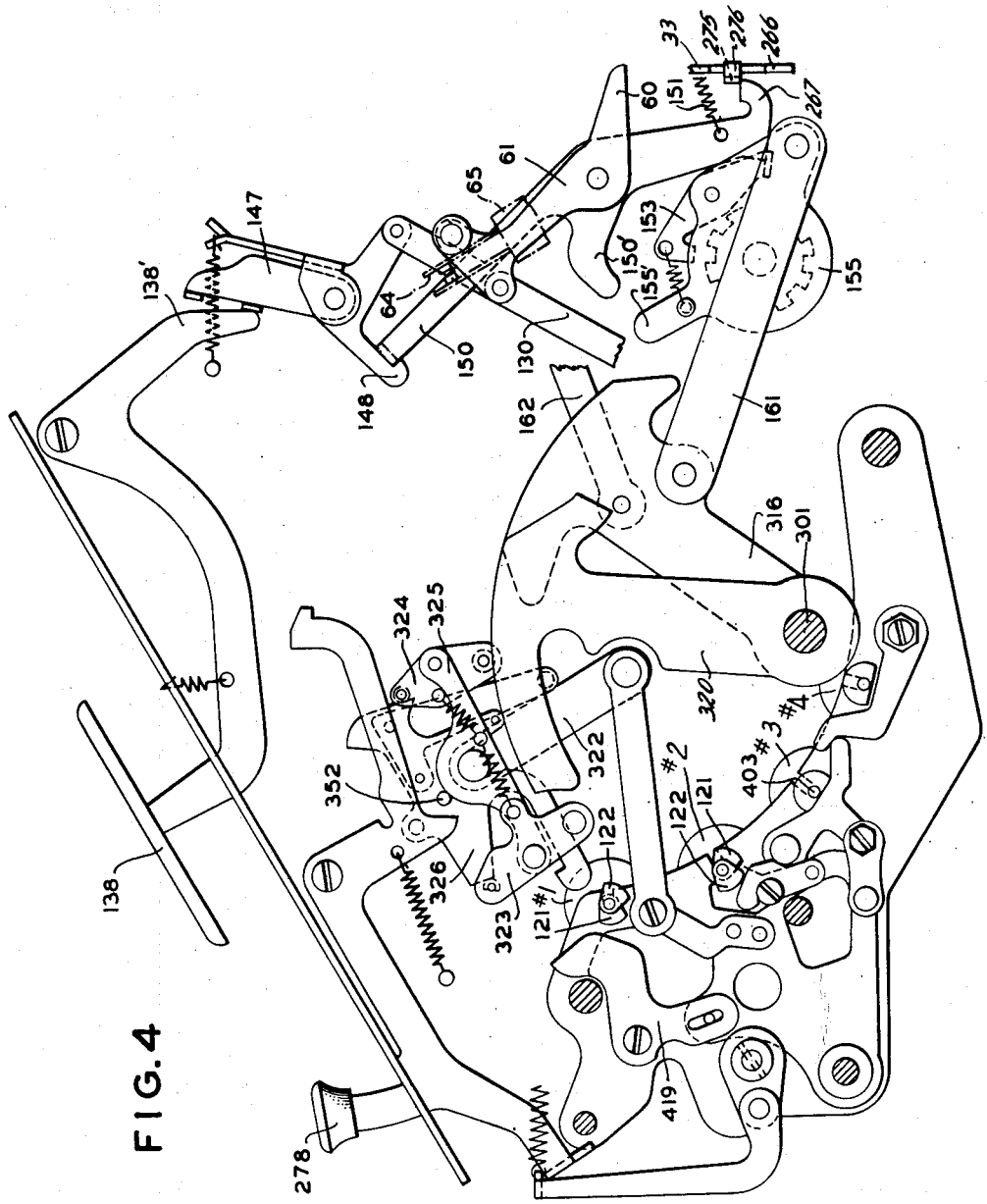
FIG. 4 is a right side elevation of the cyclic accumulator controlling mechanism and showing the cyclic operating clutch means.

When this zeroizing operation has progressed to the left hand side of the machine a stud 630 (FIG. 5) in the total segment 618 will contact with a projection 129 of a rod 130 connected at its other end of the latch member 148 (FIG. 4). Latch 148 will thus be moved out of engagement from clutch lever 150, and effect operation of the cyclic clutch devices, as in the manner earlier described.

The machine is set for a reverse or subtractive operation by contact of the operated total key 278 with a pin 352 (FIG. 4) on rocker control plate 326, the total key thus holding the plate out of the path of clockwise rotation of the forward cam follower 323, so that the accumulator will not be disengaged in the beginning of the operation, by the action of the cam arm 320. On the return stroke of the parts, the forward cam follower 323, coacting with cam arm 320, will disengage the accumulator wheels from the actuator segments 610. In the above operation the described setting of plate 326 also disables the rear cam follower 324 while at the end of the cycle of operation a pin 350 (on cam 318, FIG. 3) will contact with arm 322 and restore rocker 325.

The machine being put in operation, frame 616 will carry the dogs 617 forwardly, so that they will snap under the stop members 613 and studs 659 of the segment levers 610. The hammers will now be tripped and upon rearward movement of frame 616 the segments and total stops will be restored to normal position.

The total key is locked in depressed position by a latch member 223 (FIG. 5), and is released near the end of the machine cycle of operation by engagement of a finger 163′ of a rock arm 163 driven by link connection 162 (see also FIG. 4) with the rock cam 316, above a click pawl 222 of latch striker 220, the parts of the total setting mechanism being then restored to normal position.

In the machine illustrated, the upper or No. 1 accumulator is a crossfooter, designed to accumulate the values entered into each of the other accumulators during a single series or line of entries. No. 2 accumulator is customarily a debit register, and is set for subtractive operation, it being noted that a complimentary value will stand on this No. 2 accumulator and that the addition of this complimentary value to another (the No. 1) accumulator during the taking of a total will be equivalent to the subtraction of the true amounts registered in No. 2 accumulator from the amounts registered in the No. 1 accumulator. Thus, a vertical total or a total of all of the entries in each of the accumulators, No. 2 to No. 4 may be taken, these totals being transferred to the No. 1 accumulator to show a grand total.

*Carriage Controlled Program Mechanism*

For setting the various accumulators to add, subtract or non-add, in accordance with the tabular position of the record carriage, a tabulating program bar 1 (FIG. 6) suitably supported in the end frames of the transversely shiftable record carriage is provided with a series of notches 2. Said notches are spaced in accordance with the columnar positions of a given form sheet, and adapted by engagement with a projection 6 of a detent 7 to secure the carriage against lateral movement under the influence of a spring drum 8.

During a machine cycle of operation a trigger 184 is caused to be reciprocated in well-known manner, first upwardly and then downwardly, to thereby disengage the detent 7 from the shoulder 193 of the notched tabulator bar 1.

The carriage, being thus freed from the restraint of detent 7, near the end of the cycle will be shifted by means of spring drum 8 until the detent is engaged by the shoulder or wall 193 of the next adjacent notch of bar 1. This engagement serves not only to arrest the platen carriage in its next tabular position, but also effects engagement of the well-known clutch means 24 shown in FIG. 7, for effecting an operation of the accumulator control mechanism in the following manner, and as more fully set forth in the above reference patents.

Figure 6:
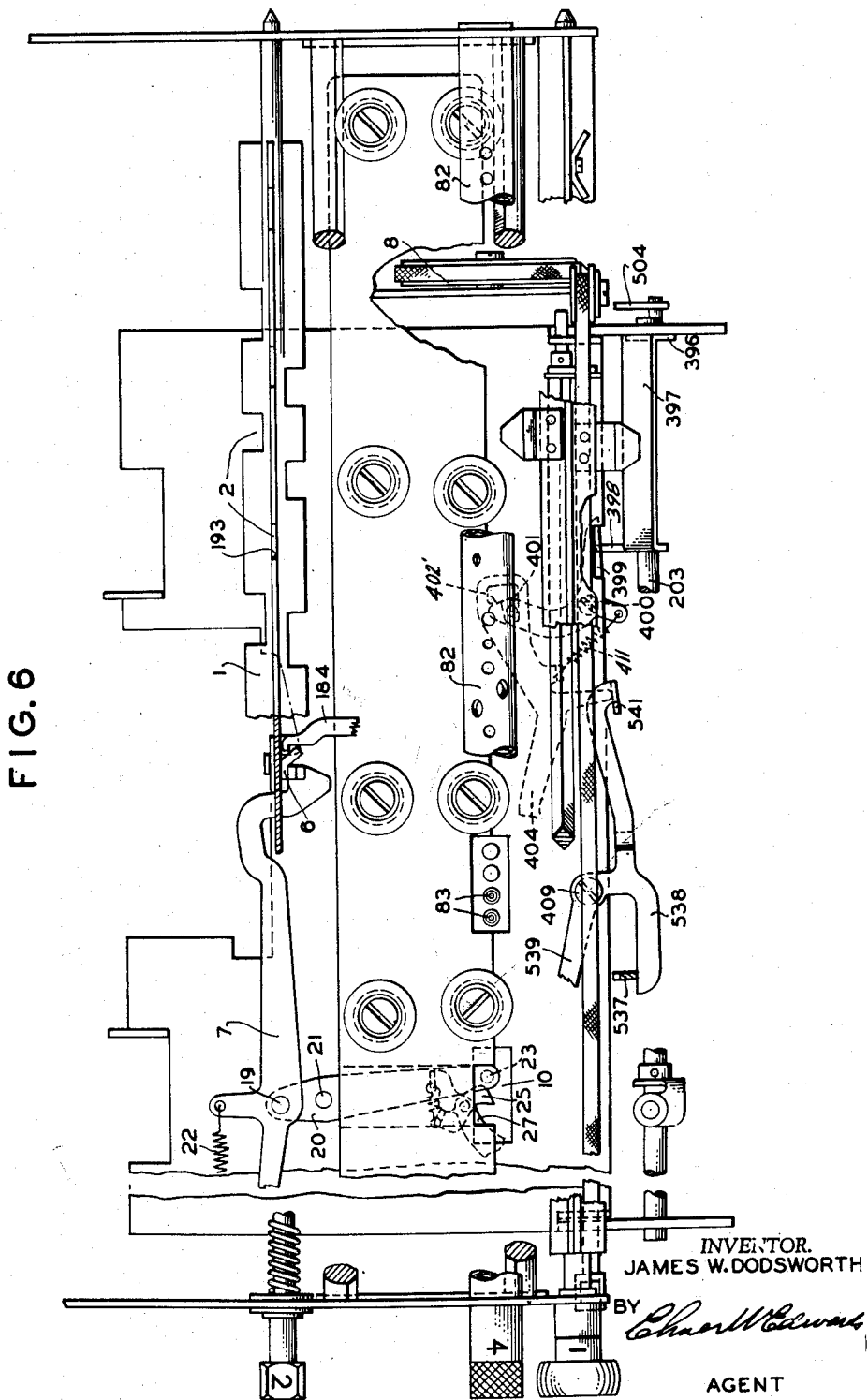
FIG. 6 is a rear elevation showing the carriage tabulating means and a portion of the register selection program tube.

Detent lever 7 is pivotally mounted at 19 (FIGS. 6, 7) upon a lever 20 intermediately fulcrumed at 21 upon the rear casing of the machine and provided with a stud 23 adapted to contact with said casing through a suitable aperture 10, thus limiting the movement of lever 20. Upon release of detent 7, the detent spring 22 will rock lever 20 clockwise about fulcrum 21, moving stud 23 past a click pawl 25 from the position of FIG. 7 to the position as shown in FIG. 6.

Figure 7:
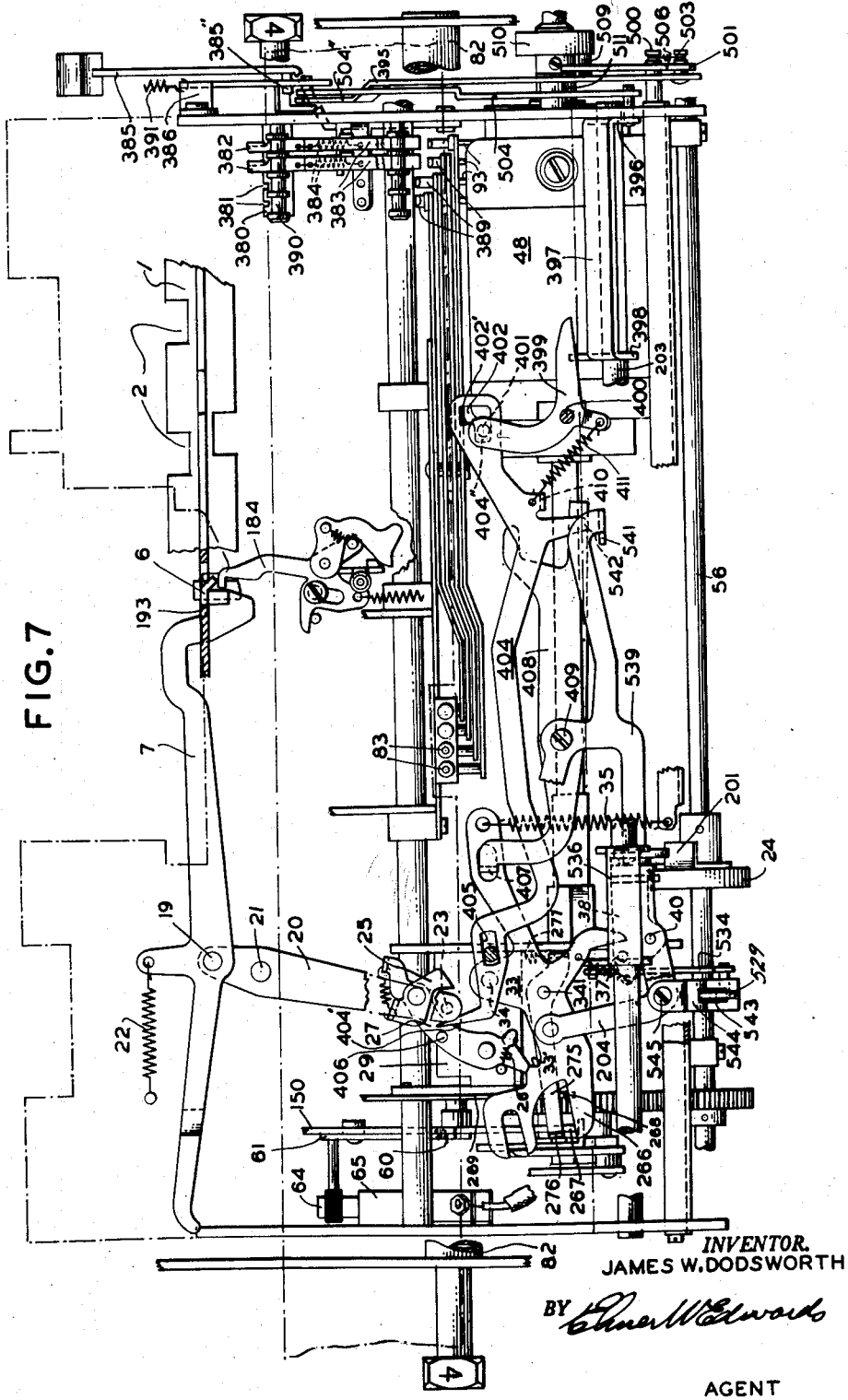
FIG. 7 is a rear elevation showing the program modifying means and the register selection clutch operating control devices.

Reengagement of detent 7 with the tabulator bar 1 however will cause lever 20, under pull of the spring drum 8, to move back to its original position of FIG. 7, bringing pin 23 against pawl 25 and thereby rocking a latch 27, on which said pawl is mounted, out of engagement with a spring operated lever 33, fulcrumed at 34 on the framing 29.

Upon operation of lever 33 a downwardly extending projection thereof will engage a pin 37 fixed to a clutch control lever 38, moving the latter counterclockwise about fulcrum 40, out of engagement with the usual pawl of the spring engaged one cycle clutch means 24, of well-known design.

Clutch 24 is adapted to connect the motor 48 with a shaft 56, having fast thereon a crank arm 58 (FIG. 2), connected by link 67 with a rocker 69, mounted on shaft 70. Rocker 69 has spring connections 94 with a series of levers 93, connected each by a link 96 with one end of whiffletrees 86 (FIG. 7). The other ends of the whiffletrees are connected with feelers 83, having reduced free end portions adapted to allow the feelers three positions of adjustment toward the axis of an index tube 82 (FIG. 6), mounted in the platen carriage, in accordance with the location of a large perforation of said tube, a small perforation or no perforation, in the path of movement of the feeler.

As fully set forth in reference Patent 2,756,926 a movement of rocker 69 (FIG. 2), transmitted from drive shaft 56, will, through springs 94 and suitable guide connections 92 between the rocker and the levers 93, first move these levers forwardly and the feelers 83 rearwardly until the feelers are stopped in one of three positions by index tube 82.

The feelers 83 being moved toward the tube 82 will be immediately arrested, if no perforation of said tube is in line with the feeler, whereas if a large perforation of the tube 82 is opposite the feeler said feeler will move freely to its full extent of movement. If a small perforation of the tube 82 is opposite one of the feelers 83, the shoulder of the feeler will contact with the marginal walls of the perforation and the feeler will be held in an intermediate position.

Figure 2:
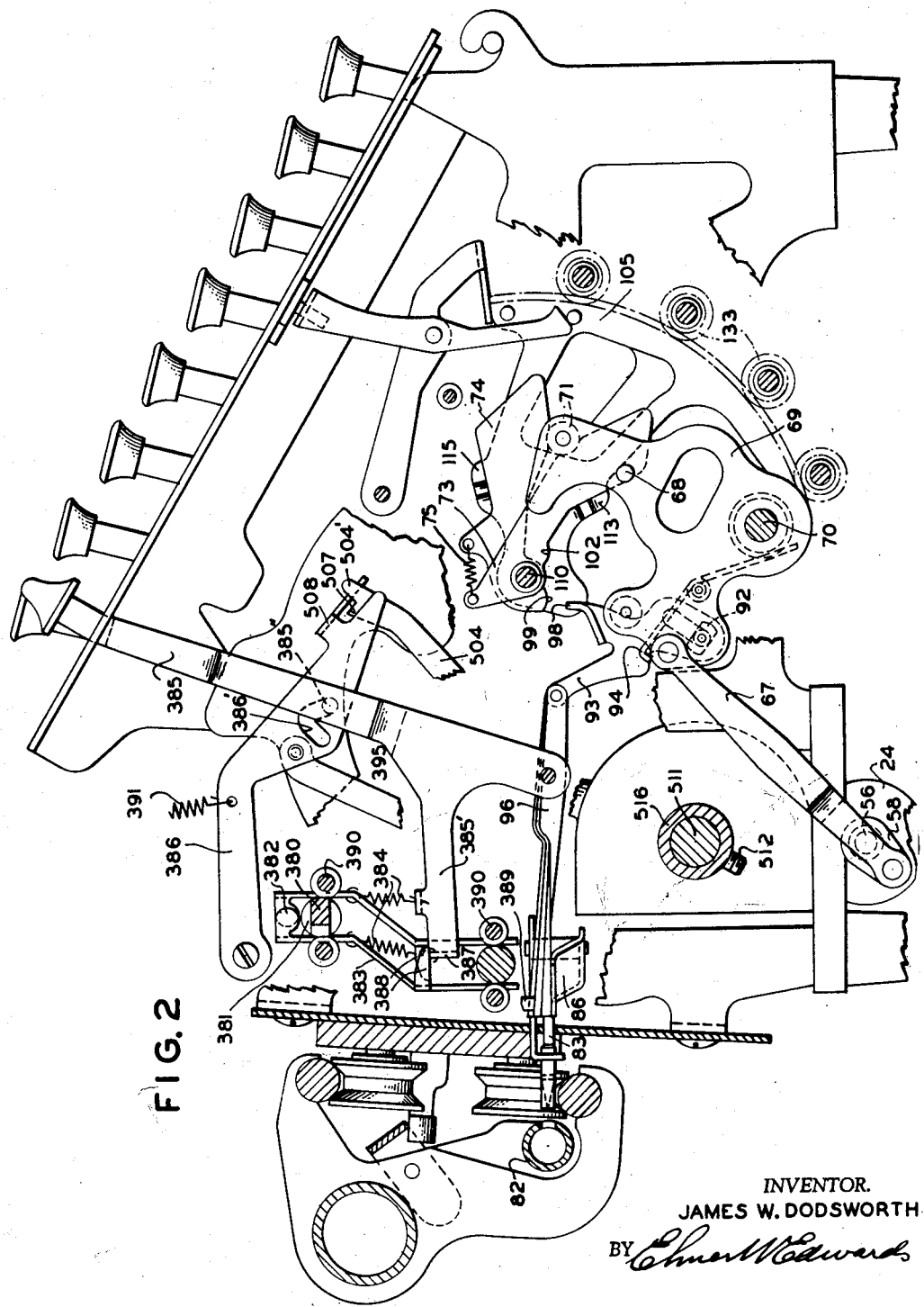
FIG. 2 is a left side elevation showing the accumulator program control means, with modifying control means therefor adjusted by the vertical total lever.

Levers 93 (FIG. 2) are provided with lugs 98, these lugs taking one of three positions, in accordance with the position of the related feeler, so that the lugs are brought under the surface 99 of a dog 74, under the surface 102 of a dog 73 or to a position immediately beneath a shaft 110 supporting the dogs 73 and 74. Normally dogs 73 and 74 are locked in either a raised or a lowered position by engagement of a roller 71 of the plate 69 with the upper or with the lower surface of the dogs. Upon movement of the plate 69 however, roller 71 will be moved out of engagement with the dogs 73, and 74, and these dogs will be allowed to assume the position illustrated in FIG. 2, under influence of a connecting spring 75. However, if the lug 98 of lever 93 has been positioned by the related feeler under the surface 99 of dog 74, the spring 94 will cause the dog to be moved downwardly until the point of the dog lies below roller 71. Continued rotation of shaft 56 will rock the plate 69 in an opposite direction, and the roller 71 thereupon acting upon the dog 74 will rock the dog downwardly into a lowered position. On the other hand contact of lug 98 with surface 102 of dog 73 will position said dog for an upward movement by the action of roller 71. Dog 73 contacts with a lug 113 of a segment 105, and dog 74 contacts with an opposite lug 115 of said segment. Therefore, the positioning of the two dogs on opposite sides of the roller 71, as shown in FIG. 2 will hold segment 105 in a central position while location of the dogs below the roller 71 will position the segment 105 in a lower position, and location of the dogs above the roller 71 will raise the segment. There are four pairs of dogs 73, and 74 and four segments 105, each segment being engaged with a pinion 133 mounted upon a universal jointed extension of one of the accumulator shafts 403, and the position of the segments by the dogs above described provides the three positions of a radial adjustment of the shafts 403 and the cams carried thereby.

As earlier set forth cams 121 and 122 (FIG. 4) of the No. 1 and No. 2 accumulators are arranged in different angular position upon their shafts. That is, from a position of adjustment of the shaft 403 wherein neither cam 121 nor 122 is in active position, a one-third rotation of the shaft 403 of the No. 1 accumulator in a counterclockwise direction (FIG. 4) will bring the lobe of cam 122 into active position, whereas a similar movement of the shaft 403 of the No. 2 accumulator will bring the lobe of cam 121 into active position. This one step of counterclockwise movement is effected by movement of a feeler 83 from its non-add position, against the unperforated surface of tube 82, into its midway position, in which the shoulder of the plunger engages the marginal wall of a small hole of the tube 82. The effect is to set the No. 1 accumulator into subtracting position and the No. 2 accumulator into adding position. A second step of counterclockwise adjustment of these shafts 403 will render the adding cam 121 of the No. 1 accumulator active and the subtracting cam 122 of the No. 2 accumulator active, this being the position taken upon movement of the feelers 83 into the large perforations of the tube 82, and also being the position of the cams illustrated in FIG. 4.

Vertical Totals

As more fully set forth in the reference Patent 2,756,926 vertical totals may be taken at the will of an operator by manually adjusting a vertical total lever 385 (FIG. 2) rearwardly. The rearward setting of lever 385 is adapted to initiate a register selection cycle of operation of clutch 24, adjust means to cause subsequent automatic operation of the totalizing devices and will also adjust certain program modifying slides so that a totalizing operation effected upon a given register will transfer any totals registered thereon to the No. 1 register, as will now be described.

A cylinder 380 (FIGS. 2 and 7) is mounted in the frame of the machine, said cylinder being notched as at 381 to provide seats for the stop lugs 382 of program modifying slides 383. Normally these slides are held out of contact with the cylinder 380, as lever 385 is held in the forward position by a cam notch 386' of a spring latch pawl 386, so that, a lateral projection 387 on arm 385' of said lever is held upward against lugs 388 of the slides. Lever 385 extends above the keyboard of the machine and when moved rearwardly by the operator, to the rearward position of notch 386', suitable springs 384 of the slides 383 are tensioned and will serve to move the slides downwardly into contact with the cylinder 380. If a notch 381 of cylinder 380 is below one of the lugs 382, the related slide 383 will be allowed to move downwardly into its operative position in which the lower end of the slide will be in the path of movement of a pin 389 extending above the pivotal points of junction of the levers 86 with the links 96. Should no notch 381 of cylinder 380 lie below a lug 382 of a slide 383, said slide will be held in inoperative position, above the path of movement of the related pin 389.

There are two series of slides 383, comprising a rearward series lying adjacent the pins 389, and adapted to prevent movement of the feelers 83 beyond their position of contact with the tube 82. The slides 383 of the forward series are spaced from the related pins 389 by a distance corresponding to the movement of the feeler plungers into contact with the marginal walls of the small perforations of the tube 82. Therefore, the slides 383 of the rearward series are adapted to hold the feelers in non-add position, while the slides 383 of the forward series are adapted to hold the No. 1 accumulator in adding position regardless of whether the feelers register with a small or with a larger perforation of tube 82.

On the machine illustrated, slides 383 are provided for the feelers of the No. 1 and No. 2 accumulators, and the guide rods 390 between which the slides are mounted are provided with seats for slides 383 related to the No. 3 and No. 4 accumulators, and designed to hold such accumulators in non-add position.

Manipulation of the vertical total lever 385 is adapted not only to modify the normal control of the program devices but will also initiate and effect a vertical total operation, as in the following manner.

Latch pawl 386 has link connection 395 (FIG. 1) with a forwardly extending arm 396 of a bail member 397, pivotally supported upon transverse shaft 203. The right side of bail 397 terminates in a forwardly extending arm 398, which extends beneath one arm of a bell crank lever 399 (FIGS. 6, 7), pivotally mounted at 400 to the rear casing of the machine. An upper arm of bell crank 399 is provided with a pin 401 extending within a shouldered notch 402 formed in one end of a slide 404 as shown, the opposite end of slide 404 being supported through pin and slot connection 405 to a suitable subframing of the machine.

Upon a rearward movement of vertical total lever 385 (FIG. 1) pin 385" of said lever in moving to the rearward end of cam notch 286' will first rock latch pawl 386 in a clockwise direction and will then immediately release said pawl for counterclockwise operation, under influence of its spring 391. During said reciprocation of latch pawl 386 link 395, through bail 397, imparts a reciprocatory clockwise and return operation to the bell crank 399 (FIG. 7) and to pin 401 thereon. Upon clockwise displacement of pin 401 slide 404, under influence of a spring 411, is rocked downwardly and will bring the shoulder 402' of notch 402 opposite said pin, whereafter as said pin is restored counterclockwise slide 404 is moved leftwardly (FIG. 7) therewith.

Upon leftward movement of slide 404 an upwardly extending arm 404' thereof will engage a pin 406 mounted on the latch 27, rocking said latch out of engagement with the register selection clutch release lever 33, to thereby effect a cycle of operation of the register selection clutch 24, as in the manner earlier described.

A rearward arm of clutch lever 33 however has slotted connection with a lug 407 of a lever 408, fulcrumed to the rear framing of the machine at 409, and said lever 408 extends beneath a lug 410 of the slide 404. During the above described movement of lever 33 the lever 408 is rocked counterclockwise thereby and will lift slide 404, thereby releasing shoulder 402' thereof from pin 401 and permitting the slide, under influence of the spring 411, connected thereto and to the lower end of bell crank 399, to be returned toward the right along slots 402, 405, thereby releasing latch 27 for reengagement with clutch lever 33 for terminating the register selection operation.

During the above register selection cycle the program modifying cylinder 380 through slides 383 limits the feeler 83 related to the No. 1 register for a partial movement and thereby modifies the normal plus control thereof of said register to a minus operation control, while an imperforate portion of tube 82 will limit movement of feelers 83 of the No. 2 and No. 3 registers for a non-add operation control, and feeler 83 related to the No. 4 register, again engaging the large perforation of tube 82 will effect a plus operation control of said register.

A rearward adjustment of the vertical total lever 385, as full set forth in U.S. Patent 2,756,926, will also control devices whereby an operation of the register control means by the register selection clutch will act to effect an automatic operation of the total taking devices, as follows.

Pivotally mounted at 392 (FIG. 1) to the left side framing of the machine is a bell crank lever 393. The forward arm of lever 393 is provided with a lug 394 extending beneath the rearward arm 385' of lever 385. Lever 393 is provided with a downwardly extending arm 393' lying forwardly of the connecting pin 207 of a lever 206 which embraces the bifurcated end of the lever 208. Lever 208 normally holds the pawl 211 from operating engagement with pin 68 of the rock arm 69, operated by the register selection clutch. Upon rearward adjustment of the vertical total lever 385, however, the lever 393 is rocked clockwise and will engage pin 207 rocking lever 208 clockwise, releasing said lever from lug 210 of pawl 211. Upon subsequent operation of rock arm 69 pin 68 engaging surface 255 of pawl 211 then acts through lever 248 to break suitable toggle means 250, whereupon said means will act to impart rotation to a transverse shaft 252, clockwise as seen in FIG. 1 and counterclockwise as viewed in FIG. 5, to effect depression of the total key 278, in known manner.

Following a total printing and transfer operation the platen carriage then tabulates in known manner to a subsequent columnar position, where stud 23 (FIGS. 6 and 7) again effects release of the register selection clutch 24 and a second vertical total operation is thereupon effected, as in the manner previously described.

It is recalled that values are entered upon No. 2 register as complements. However, suitable well-known negative total devices, employing three consecutive subtractive operations of the actuators 610, in the manner fully disclosed in U.S. Patent 1,915,296 issued August 22, 1931 to Loring P. Crosman are provided for transposing and thereafter printing of a complemental total as a true value. During any such conversion of the No. 2 register value the No. 1 register, being controlled for addition, will make three plus operations, whereby the complemental total from register No. 2 is transferred to the No. 1 register, and the addition of said complemental value being equivalent to the subtraction of a true amount, the true vertical total is thus subtracted from any value stored in the No. 1 register.

Also for the corresponding position of the carriage imperforate portions of the tube 82 will act to control the feelers 83 related to the No. 3 and No. 4 registers so as to effect a non-add operations of said registers.

Machines of the character herein described may be operated in accordance with various programs of operations, such as are illustrated in the reference patents, wherein machine cycles of operation for the registering and printing of values are followed by an automatic carriage shift and thereafter by an automatic register selection clutch operation with the carriage in the new position. Also totalizing operations may be effected automatically under control of the record carriage and alternatively by the earlier described manually operable total taking keys 278, 273, or by the vertical total lever 385.

In order that certain mechanisms will not be operated out of turn before other mechanisms have completed their operations a complex of interlocks and associated control means are provided, as hereinafter described.

To prevent an operating cycle of the machine while a carriage shift and subsequent register selecting cycle is taking place known interlock means are provided as follows:

It will be recalled that upon a completion of an operating cycle of the main clutch crank 155 (FIG. 4) a projection 155' thereof will engage projection 150' of the clutch release control lever 150 and imparts a clockwise movement to said lever. This clockwise movement of lever 150 is sufficient to rock a projection 267 thereof from beneath a lug 276 of a lock lever 275, pivotally mounted at 341 upon the plate 33, as shown in FIG. 7. Release of lock lever 275 will cause said lever under influence of a spring 277 to be rocked counterclockwise, thus moving lug 276 downwardly into engagement with a projection 266 of the plate 33. Lever 275 will thus be positioned opposite the projection 267 (FIG. 4) of lever 150 to prevent effective operation of the cyclic control key 138, and opposite also the end 268 (FIG. 5) of a lever 269 to prevent movement of said lever, thus locking (through link 270 and lever 271) the total and subtotal keys 278, 273 against depression.

As plate 33 is later caused to be moved upwardly by spring 35 (upon completion of a carriage shift) to initiate a register selecting cycle, the projection 266 of said plate will relatch the lock lever 275 upon projection 267. However, projection 266 will now be positioned opposite projections 267 and 268 and the operating keys will continue to be locked until plate 33 is restored by suitable cam means 201 upon completion of the register selection clutch operation, as in known manner. Should the total or subtotal keys, 278, 273 be first depressed either will adjust the lever 269 so that the end 268 thereof is positioned above the setting clutch control plate 33 and so will prevent any operation of said plate until the active key is restored near the end of a machine cycle of operation of rock lever 163 (FIG. 5), as earlier described.

If operating key 138 should be depressed first, thus releasing clutch lever 150, the end 267 of said lever moves over the projection 266 of plate 33 and thus will prevent any operation of setting clutch 24 until near the end of a machine cycle of operation when tooth 155' acts to restore lever 150.

It has been found that particularly for such programs wherein a vertical total operation is to follow immediately subsequent to any normal or crossfooter totalizing operations the operator, having an additional time period at her disposal while the machine completes an extra cyclic control operation, such as during the successive zeroizing of a register or the plural cycles of operations related to effecting a true negative total operation, will frequently anticipate a vertical total operation and is very apt to inadvertently set the control lever 385 before the preceding machine cycle of operation is fully completed.

It is recalled that a setting of the vertical total lever at any time will cause an adjustment of the program modifying control slides 383, as earlier described with reference to FIG. 2. Thus, if said lever is adjusted prematurely, while the machine is still cycling, a mixup with respect to the subsequent proper selection of the registers would result and any values previously stored therein would now become completely confused. Also, in any such premature operation of said lever the latch pawl 27 (FIG. 7) is tripped free of the register setting clutch control plate 33 so that said plate immediately moves upward slightly until stopped by the interlock 267 or 268, whichever is active. It also will be recalled that near the completion of a machine cycle of operation trigger 184 acts to release pawl 7 from the tabulating bar 1 and so will initiate a carriage shift operation. It will be apparent however, that should a carriage shift occur simultaneously with a release of plate 33 for initiating a setting clutch operation the sensing fingers 83 under such a circumstance would attempt to engage with the perforations of tube 82 while the carriage is in motion and a jamming of the parts would occur.

To obviate such misoperation of the vertical total lever applicant provides novel control means, as will hereinafter be described, whereby said lever in any operations other than a permissible vertical total lever operation will immediately prior to a start of any cyclically operable parts driven by the motor be automatically locked and will remain so locked throughout any series of cyclic and extra cyclic sequence of machine operations and until released automatically thereafter, to be available for a vertical total taking operation at the proper time.

*Means for Preventing Misoperation of Vertical Total Lever*

Pivotally mounted upon a stud 500 (FIG. 1) on the left side framing of the machine is a bell crank lever 501 having an open end slot embracing a pin 503 fast to the lower arm of a second bell crank lever 504, pivotally mounted at 505 to the machine framing. Tensioned between pin 503 and pivot stud 500 is a spring 506 acting to bias both the said levers 501 and 504 in a clockwise direction, whereby a shoulder 507 on the upper arm of bell crank 504 is caused to be normally held free of a lug 508 on the spring latch pawl 386 for the vertical total lever 385.

Figure 8:
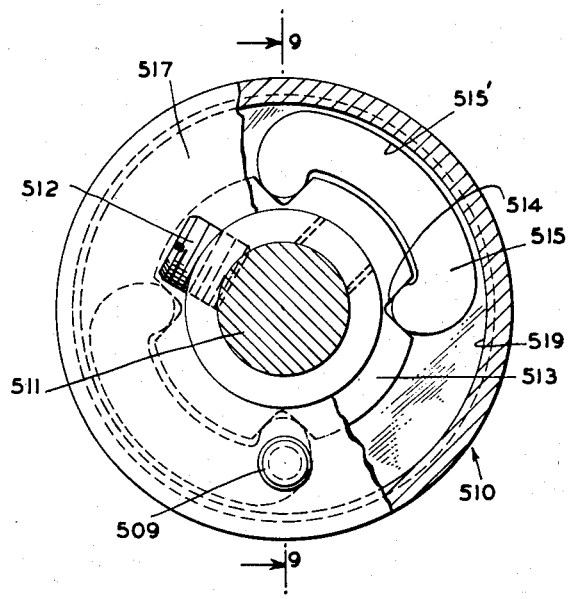
FIG. 8 is an enlarged detail view of the centrifugal slip clutch device of the novel interlock control means.
Figure 9:
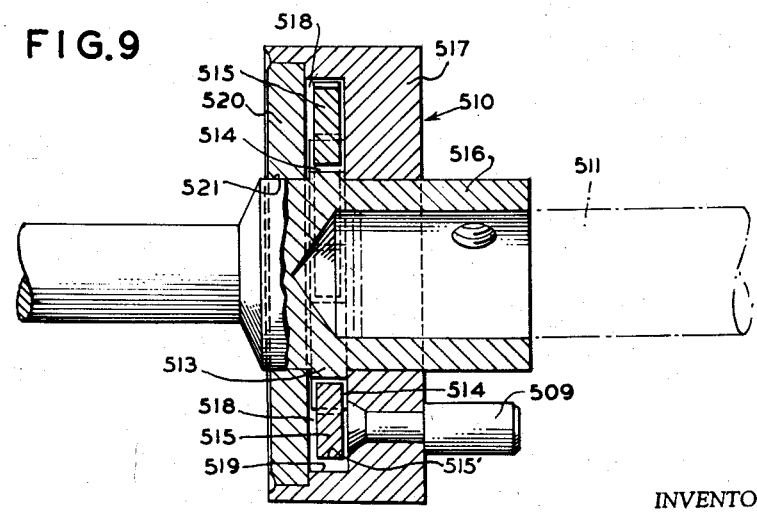
FIG. 9 is a cross-section on line 9—9 in FIG. 8.

An upward extending arm 501' of the bell crank lever 501 extends within the path of movement of a pin 509 fast to the driven side of a centrifugal slip clutch, being generally designated 510, constructed and automatically operable in the manner and purpose as will now be described with particular reference to FIGS. 8 and 9.

Mounted upon a leftward extension of the motor shaft 511 for rotation therewith, by means of a suitable set screw 512, is a drive disc 513 within the peripheral diameter of which is cut four similar V-shaped cam notches 514. Freely nested with their opposite ends supported within each related pair of said cam notches is a clutch shoe 515 the outer peripheral surface of which extends in a concentric arc around the motor shaft 511. Loosely mounted for rotation upon a hub portion 516 of drive disc 513 is a clutch drum 517 and forming a housing with respect to slip clutch 510. Said drum is provided with a recess 518 within which the pair of clutch shoes 515 are inserted so that normally a slight clearance is provided between the internal wall 519 of clutch drum 517 and the outer peripheral surface 515' of said clutch shoes. A retainer disc 520 for holding the shoes 515 in place is slipped loosely upon the shoulder 521 of drive disc 513 to take bearing thereon, whereafter said retainer is then swedged securely within a shouldered recess of said clutch drum 517 and will thus be rotatable therewith.

It is recalled that the machine cycle clutch control lever 150 (FIG. 4) when tripped to initiate a main clutch cycle of operation will act also to immediately engage the contacts 64 of motor switch 65 and so start electric motor 48. Thus, instantly that the motor shaft 511 starts in operation the drive disc 513 also rotates therewith and the cam notches 514 will carry clutch shoes 515 in an arc around shaft 511 and as aided also by the centrifugal action imparted thereto by such rotative operation thereof, forcing the surface 515' of said clutch shoes into frictional engagement with the internal wall 519 of clutch drum 517. Thereupon clutch shoes 515 will act to immediately displace clutch drum 517 in a clockwise rotation (FIG. 1) and pin 509 on said drum engaging lever 501 imparts a counterclockwise movement thereto, and through means of pin 503 also to the bell crank lever 504, until stopped by engagement of a projection 504' of said lever with lug 508. Upon said operation of lever 504 the shoulder 507 thereof is now caused to be positioned beneath the lug 508 of latch pawl 386, so that said latch and thereby the vertical total lever 385 is now held against any operation. Thus so long as the motor continues in operation clutch drum 517 will hold lever 504 in the above described operated position, the clutch shoes 515 being permitted to slip in a light frictional engagement with the wall 519 of said clutch drum.

It will be recalled that clutch lever 150 (FIG. 4) is restored near the end of a machine cycle of operation and will therefor release contacts 64 of motor switch 65 and that the carriage is meanwhile released for a tabulating operation, as in the manner earlier set forth. However, during such carriage tabulation the momentum of the motor, with switch 65 now disengaged, will continue to maintain the vertical total lever in the locked condition above described. When the carriage thereafter is brought to rest in any subsequent columnar position clutch plate 33 (FIG. 7) is caused to be tripped, as earlier described, and will engage end 60 of switch control lever 61, whereby switch 65 is again closed for continuing the motor in operation until released at the termination of the subsequent operation of the setting clutch 24, as in the manner hereinbefore described.

It may be that in the new columnar position of the carriage an automatic regular total taking operation is to be effected following such setting clutch operation, as in the manner earlier set forth, and in which case a successive zeroizing of the registers will occur prior to a subsequent release of the cyclic clutch lever 150 for operating switch 65 incident to a total printing cycle of operation of the machine. Under such a circumstance the motor again continues under momentum and will serve to maintain the vertical total key lock devices active during such zeroizing operation and until switch 65 again picks up the motor circuit.

After the conclusion of any operation wherein the motor subsequent thereto is permitted to come to a rest the clutch shoes 515 will automatically release clutch drum 517 and spring 505 will impart a counterclockwise operation to levers 501, 504, thereby releasing shoulder 507 from beneath lug 508 and the vertical total lever 385 is now free for operation at the will of the operator.

It may be that a manual total taking operation may be called for in any given columnar position of the carriage and so would immediately initiate the spring operated precyclic zeroizing operation of a register prior to any motor operation, in which case the vertical total lock during such operation would remain ineffective and the vertical total lever during such zeroizing operation would be subject to misoperation.

To avoid such a contingency a motor switch 523 (FIG. 5) is now provided in parallel circuit with the motor switch 65 and is operable to immediately start the motor upon the rocking of a plate 271 in the depression of either total key 278 or subtotal key 273, thereby immediately locking the vertical total lever against operation, as in the above described manner.

The above described slip clutch arrangement provides a very simple control means universally adapted to bridge any critical time hiatus as might occur where a control of any given means is transferred from one device which is being normalized to the control of another device to be subsequently active in a successive sequence of operations of such devices. However, it may occur that the motor cord may inadvertently be disconnected, or other circuit failure may occur, which wile rendering the motor and therefore the said control means inactive will yet permit of an operation of any of the manual control keys earlier described. If at any time during a power circuit failure the vertical total lever 385 is moved to active control position the control plate 33 (FIG. 7) will be tripped, as in the manner previously described for releasing setting cycle clutch 24, and it will be recalled that such a movement of plate 33 will act to block operation of the total or subtotal keys 273, 278 and also of lever 150, controlling the main clutch means. If, however, with the power off, the main clutch means should happen to be first released and thereafter the vertical total key is also operated the latch pawl 27 will now be held in a tripped condition by the slide 404, operable with said key is earlier described. At the same time plate 33 being now released from latch 27 is held in a partially raised position, as intercepted by the interlock devices 267, 268 which were previously set to active condition in connection with the above main clutch tripping operation.

It is apparent therefore that under the above condition if power is now restored the main cltuch cycle will take precedent and that during the main clutch cycle interlocks 267, 268 upon being restored will release control plate 33 and unless other means are provided would cause an operation of the setting clutch. It will be recalled however that near the end of a main clutch operation the carriage tabulating means described with reference to FIGS. 6, 7 is also tripped to release the record carriage. Under the above circumstances a setting clutch operation and a carriage shift operation would occur concurrently and so would cause a jamming of the program feelers 83 with the program tube 82 on the carriage, as earlier set forth.

To obviate such a conflict special devices are provided, as hereinafter described, whereby during the machine cycle of operation plate 33 is caused to be automatically restored while at the same time latch 27 will be released for reengagement with said plate 33 as shoulder 402' of the slide 404 is caused to be lifted by said devices free of the vertical total operation control pin 401. Wherefore release of the setting clutch 24 is now delayed until after the carriage shifting operation is completed, whereafter pin 23 of the tabulating means thereupon serves to trip plate 33 for initiating a vertical total operation of the setting clutch 24, as in the manner previously described.

Figure 5:
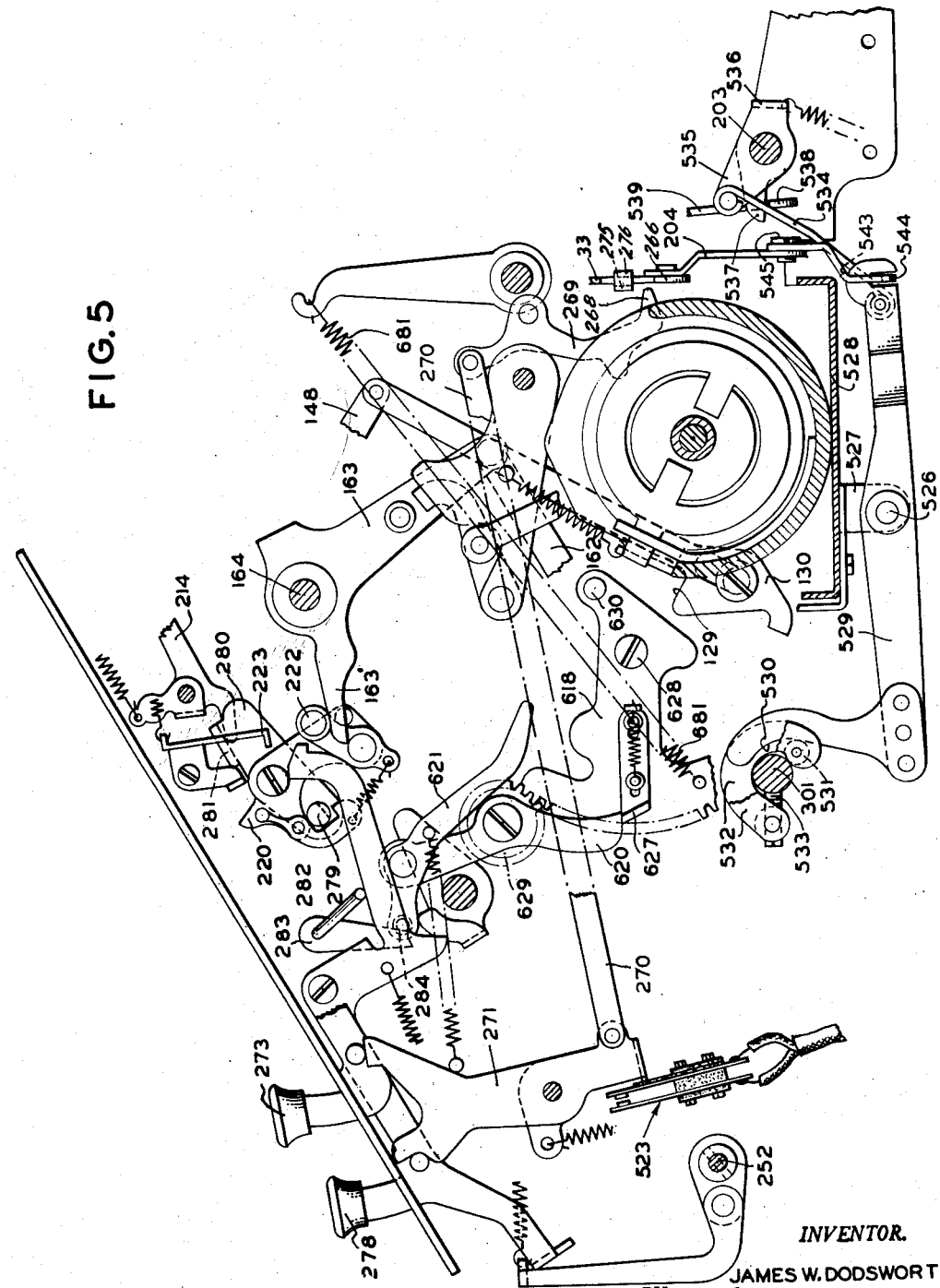
FIG. 5 is a right side elevation of parts under the control of the total and subtotal keys.

Referring to FIG. 5, pivotally mounted at 526 upon a bracket 527 fast to the motor support plate 528 is a lever 529. The forward end of said lever is provided with a cam edge 530 cooperable with a roller 531 mounted between a pair of similar levers 532 which are secured to the rock shaft 301 by means of a suitable set screw 533. As earlier described rock shaft 301 during a machine cycle of operation is rocked first counterclockwise (FIG. 5) during a forward stroke of the machine cyclic devices and is thereafter rocked clockwise in the return stroke of said devices. Thus during a forward stroke of the machine cycle of operation roller 531 engages cam surface 530 of lever 529 and imparts a clockwise rocking movement to said lever. The rearward end of lever 529 has link connection 534 with one arm 535 of a bail 536 loosely mounted upon the shaft 203. The opposite arm 537 of said bail overlies a projection 538 of a lever 539 fulcrumed at 409 (FIGS. 6, 7) to the rear framing of the machine.

During the above clockwise operation of lever 529 link 534 imparts a counterclockwise operation to bail 536 and arm 537 thereof engaging projection 538 will rock lever 539 in a counterclockwise direction, whereupon a lug 541 of said lever engages a downwardly extending projection 542 of the slide member 404 and will lift said slide to the position as indicated in dotted lines (FIG. 6), whereby to release shoulder 402' from pin 401 of the vertical total key means.

Upon release of shoulder 402' from pin 401 slide 404 under influence of spring 411 will immediately move rightwardly as viewed in FIGS. 6, 7, and the arm 404' thereof releases latch pawl 27 for clockwise movement by its spring 26 until stopped by engagement thereof with the surface 33' of the now partially raised lever 33.

As shown in FIGS. 5 and 7 the rearward end of lever 529 has also engagement, by means of an elongated slot 543, with a downwardly extending arm 544 pivotally mounted at 545 to the link 204 connected at its upper end to the trip plate 33. Near the end of the clockwise movement of said lever 529 above described plate 33 is rocked downwardly thereby and latch pawl 27 will thereupon snap clockwise under influence of its spring 26 to its normal condition for again holding said plate in the normal latched position, so that no operation of the setting clutch is effected at this time.

Upon a clockwise rotation of shaft 301 in the return stroke of the machine cycle roller 531 moving downwardly along cam surface 530 releases lever 529 and said lever together with each of the above described devices operable therewith are then permitted to return to their normal positions, under the influence of suitable spring means associated with the respective devices. Near the end of said return stroke of shaft 301 the carriage tabulating detent 7 is then tripped to release the carriage for a shifting operation and at the completion of which a setting clutch operation is effected by means of the pin 23 operable under control of the said tabulating detent, as in the manner hereinbefore described.

It will be noted that the above described relatching operation of pawl 27 with the plate 33 must occur prior to a release of the interlocks 267, 268 during the machine cycle, else the said plate 33 would be free to snap upwardly and start the setting clutch in a premature operation to the carriage shift operation.

As in the manner earlier set forth however the operation of electric motor 48 incident to effecting such operation above described will cause the centrifugal slip clutch means 510 to lock up the vertical total lever 385 against operation and following the subsequent opening of the circuit switch 65 in the restoral of said interlocks the motor momentum then serves to continue the said slip clutch in active control condition for maintaining the vertical total lever locked against operation for an extended time period sufficient to include any subsequent carriage shift operation, as in the manner fully set forth earlier in the specification.

While various systems of interlock controls wherein the interlocks are to remain active for different mechanisms operating in a related sequence of operations are known to the art such systems, particularly as relates to devices such as described herein in which certain operations are selective in character for operation or nonoperation or wherein an overlapping of such interlock controls is not feasible, have heretofore a characteristic weakness in that they are unreliable at that critical point where the control of an interlock must transfer from the control of one device to the control of another.

Applicant provides novel means whereby to universally bridge any such critical areas of control transfer as might occur either during an operation of the motor driven devices or in the operations of any devices operated extra cyclic to the motor drive by other servomechanisms, and is believed to be a substantial advancement to the art as presently known.

Having thus described a preferred embodiment of the invention, what is claimed is:

1. In a motor driven business machine having registering devices, actuators therefore, cyclic operating means including a clutch, a motor switch, control means operable for first closing said motor switch to start the said motor and for subsequently thereto releasing said clutch whereby to initiate an operation of the said cyclic operating means, and means operable during an operation of said cyclic operating means for disengaging said clutch and for thereafter reopening the motor circuit; the combination therewith of power means independent of said motor and operable in extra cyclic sequence to operations of said cyclic operating means, devices operable by said independent power means in a sequential operation with an operation of the said cyclic operating means and occurring extra cyclic thereto, a function control key, normally ineffective locking means therefor, means automatically operable by a starting operation of said motor preceding operation of said cyclic operating means and adapted for controlling said locking means whereby to prevent an operation of the said function control key prior to subsequent operations of the said cyclic operating means and throughout any continuing extra cyclic sequence operation of the said devices operable by the independent power means.

2. In a motor driven business machine having registering devices, actuators therefor, cyclic drive means including a clutch, a motor switch, control means adapted upon an operation thereof for closing said motor switch to effect starting of the motor and for concurrently releasing said clutch to effect a subsequent operation of the said cyclic drive means, means operable for disengaging said clutch and for thereafter reopening the said motor circuit to terminate an operation of said cyclic drive means; the combination therewith of auxiliary power means independent of said motor, means adapted for operation by said auxiliary power means in sequence with operations of said cyclic drive means, a function control key, normally inactive locking means for said function control key, means automatically operable by the initial rotations of said motor to render the said locking means active for preventing an operation of the said function control key prior to an operation of said drive means, and wherein said locking means is automatically released in the final rotations of the said motor following the disengaging of said clutch and said reopening of the motor circuit.

3. In a motor driven listing calculator having registering and printing devices, value actuators therefor, machine cyclic means including a clutch, a motor circuit switch, control means for releasing said clutch and for closing said circuit switch whereby to effect a machine cycle of operation, means operable for reengaging said clutch and for reopening said circuit switch to thereby terminate a machine cycle of operation, a shiftable record carriage, carriage shift means independent of said motor, and control means for effecting a carriage shaft following the said machine cycle of operation; the combination therewith of a function control key, normally ineffective locking means for said control key, means operable by said motor in the initial rotations thereof to displace said locking means to effective condition for preventing an operation of the said function control key, and wherein following the termination of said machine cycle of operation the motor momentum will serve to maintain the said locking means in effective condition during said carriage shift operation.

4. In a motor driven listing calculator having registering and printing devices, value actuators therefor, a circuit switch for said motor, machine cyclic devices, control means for closing said motor circuit and for initiating an operation of said machine cyclic devices, means operable for reopening said motor circuit and for terminating an operation of said machine cyclic devices, totalizing means for the registering devices including auxiliary power means for effecting a zeroizing operation thereof independent of said motor, control means for initiating a zeroizing operation of said auxiliary power means, and means subsequently operable by said auxiliary power means to thereafter effect an operation of the first said control means for initiating a total printing operation of said machine cyclic devices; in combination therewith a normally operable function control key, locking devices for said function control key, means automatically operable by preliminary rotations of said motor prior to any machine cycles of operation and adapted to displace said locking devices to an active condition for thereafter preventing an operation of the said function control key, a circuit switch operable by the totalizing control means whereby to cause said preliminary rotations of said motor, means operable by the machine cyclic devices for subsequently reopening the latter said switch, and wherein subsequent to said termination of a machine cycle of operation and said reopening of the first said switch, the motor will continue under free momentum to maintain the said locking devices in said active condition until such momentum becomes sufficiently reduced and thereafter automatically effects a release of the said locking devices to their inactive condition.

5. In a motor driven calculator the combination comprising a plurality of accumulators, actuating means therefore, printing means, machine cyclic devices driven by said motor including a clutch, a normally open switch in circuit with said motor, control means for releasing said clutch and closing said switch to thereby initiate a machine cycle of operation, a shiftable record carriage having power means independent of said motor, means operable for restoring said clutch at the completion of a machine cycle of operation and for normalizing said switch to open the motor circuit, means for thereafter effecting a carriage shifting operation, register program devices including sensing elements cooperable with related control means on the record carriage and a cyclic clutch for operating said sensing elements, means operable following a carriage shifting operation for releasing the program clutch and to reengage the said motor switch for an automatic register program operation; a manual control lever selectively operable for effecting cyclic operations of the register program devices and adapted for modifying the operations of the said sensing elements during said operations of the program devices, a normally inactive locking means for said lever, means under control of said motor and operable automatically in any first operations of said motor whereby to adjust the said locking means to an active position for preventing operation of the said manual control lever, and wherein following the first said normalizing of said motor switch the motor continues in rotation under its momentum and will maintain the said locking means in active condition, and whereafter said reengagement of the motor switch will continue the motor in operation and thereby hold the locking means in active condition during operations of the register program devices.

6. In a motor driven calculator the combination comprising a plurality of accumulators, actuators therefor, printing means, machine cyclic devices operable by said motor including a clutch, a normally open switch in circuit with said motor, control means for releasing said clutch and for closing said switch whereby to initiate a machine cycle of operation, a shiftable record carriage having power means independent of said motor, means for restoring said clutch at the completion of a machine cycle of operation and for normalizing said switch to open the motor circuit, means for thereafter effecting an automatic carriage shifting operation, register program devices including a cyclic clutch in train with said motor, means for effecting an automatic operation of the program clutch following said carriage shifting operation and for reengaging the said motor switch, sensing elements operable by said program clutch and cooperable with related elements on the record carriage for controlling a register program of operation; a selective manual control means settable for releasing said clutch and for modifying the related control operations of said sensing means, devices normally ineffective of locking the said manual control means, control devices operable automatically by the starting rotations of said motor and adapted for adjusting said locking devices to an active condition whereby to prevent an operation of said manual control means, and wherein following the said normalizing of the motor switch at the conclusion of a machine cycle of operation the motor will continue in operation under momentum and thereby maintain the said locking devices in active condition during the subsequent carriage shifting operation, and wherein the said reenegagement of said switch will act to continue the motor in operation and the locking devices in continuous active condition throughout also the said automatic register program operation.

7. The invention according to claim 6 and including zeroizing means for the accumulators, power means therefor independent of the motor, means settable by the record carriage and subsequently operable at the conclusion of the program clutch cycle whereby to effect an automatic operation of said zeroizing means, means for normalizing the program clutch and said motor switch at the conclusion of a program cycle of operation, and wherein the motor during said zeroizing operation will continue in rotation under its momentum following said normalizing of the motor switch and will continue the locking means in active condition, means subsequently operable by the zeroizing means for thereafter effecting a closure of said motor switch for effecting a total printing machine cycle of operation, and wherein at the conclusion of which the first said restoring means terminates the machine cycle of operation and reopens the motor switch for permitting the motor to stop and thereby release the said locking means to inactive condition.

8. In a motor driven business machine having registering devices, actuators therefor, cyclic drive means including a clutch, a motor switch, means for closing said switch and for releasing said clutch to start a machine cycle of operation, means subsequently operable for restoring said clutch and for reopening said switch to terminate a machine cycle of operation; the combination therewith of auxiliary power means operable independently of said motor, devices operable by said auxiliary power means and adapted to be operated in sequence with a machine cycle of operation, a manually operable function control key, locking means adapted for preventing an operation of said key, control means for said locking means including a slip clutch automatically operable in the first initial rotations of said motor whereby to adjust the said locking means to an active condition, and wherein following said reopening of said switch the motor by its momentum will thereafter maintain the said locking means in said active condition, and until deceleration of the motor automatically releases said slip clutch for restoring the locking means to an inactive condition.

9. The invention according to claim 8 and wherein the said slip clutch includes an element rotatable upon any operations of said motor, a driven element adapted for adjusting the said locking means from inactive to active condition, normally inactive drive means carried by the said rotatable element and automatically displaceable upon an operation of said rotatable element to effect engagement thereof with the said driven element and to provide a yieldable drive thereto for effecting the said adjustment of said locking means.

10. The invention according to claim 8 including a slip clutch having an element in driving connection with the motor, a clutch drum adapted for adjusting said locking means from inactive to active condition, drive shoes carried by said motor driven element and adapted for frictional engagement with said clutch drum, cam notches in said motor driven element adapted for freely receiving the distal ends of a related cam shoe, and wherein said cam notches upon operation of said motor driven element will act to carry said shoes in rotation therewith and to displace said shoes into frictional engagement with said clutch drum whereby to yieldably rotate said drum and effect said adjustment of said locking means.

11. In a motor driven accounting machine the combination comprising a plurality of value registers, actuators therefor, printing means, machine cyclic devices operable by the said motor including a clutch, a normally open motor circuit switch, control means for releasing said clutch and for closing said motor circuit switch whereby to effect a machine cycle of operation, a shiftable record carriage having power means independent of said motor, totalizing means including power means independent of said motor and adapted for effecting a successive zeroizing operation of any selected register and for automatically effecting a motor operated total printing machine cycle of operation at the completion of a zeroizing operation; register program control means including a cyclic clutch in train with said motor, a plurality of sensing fingers differentially displaceable in accordance with graded perforations on the record carriage adapted for receiving said sensing fingers during an operation of the program clutch, control devices automatically operable at the conclusion of a machine cycle of operation to restore the machine cyclic clutch and to repopen the motor switch and to effect a subsequent carriage shifting operation, means for effecting an automatic operation of the motor switch and said program clutch at the completion of a carriage shift operation, means for restoring said clutch and reopening the motor switch at the conclusion of the program operation, means controlled by the record carriage in selective columnar position thereof for determining a crossfooter totalizing operation of selective registers including means operable by the program clutch for initiating a register zeroizing operation; manually settable device for selectively effecting a vertical total program of register operations including means operable by said devices for engaging the program clutch and for closing the motor switch and for modifying operations of the said sensing fingers whereby to modify the register control operations for a vertical total program, means normally ineffective of locking said manually settable devices, means operable by the motor during any starting rotation thereof and adapted for adjusting said locking means to effective condition for preventing operations of the manually settable vertical total program devices, and wherein following the normalizing operations of the motor switch the momentum of the motor serves to maintain the said locking means active during said operations of said independent power means.

12. On a motor driven business machine the combination comprising valve registers, printing devices, machine cyclic means operable by said motor including a clutch, a normally open switch in circuit with said motor, selective manual control means for releasing said clutch and for concurrently closing said motor switch, register program control devices including a clutch in train with the motor and operable independently of said first clutch, a spring tensioned control plate operable for releasing the register program clutch and for concurrently effecting a closure of the said motor switch, latching means for said plate, selective manually operable control means for releasing said latch, interlock devices under control of the first said manual control means and adapted to block the clutch release operation of said control plate, and wherein thereafter a subsequent operation of the second said manually operable control means is ineffective of releasing the said program clutch, and means operable in any subsequent operation of the said machine cyclic means for thereafter restoring the said program clutch control plate to its normal latched condition.

13. In a motor driven business machine having value registers, actuators therefor, totalizing means, printing devices, cyclic means operable by said motor including a main clutch, a normally open switch in circuit with said motor, manually operable control means for engaging said clutch and for closing the said motor switch for effecting cyclic operation of the registers, and means for automatically disengaging said clutch and said motor switch at the termination of said register operations; in combination therewith register program control devices including a clutch in train with the motor and operable independently of said main clutch, a spring tensioned control plate adapted for effecting release of the register program clutch and for concurrently effecting a closure of said motor switch whereby to effect a regular register selection program operation, latching means for said control plate, a manually settable control lever adapted for modifying the regular program selection to a vertical total program of operations, a control train between said latching means including therein means reciprocated during a unitary operation of said control lever, means conditioned during the forward movement and operable in the return movement thereof for disengaging the said latch from said clutch control plate, means operable upon operable upon operation of the program clutch for restoring said clutch release plate and said latch release means to their normal position; means for preventing a program clutch operation at such time as during a power failure the main clutch should first be tripped and the program clutch lever thereafter also be manually adjusted during said power failure including interlock devices adapted for an operation with the circuit power off and operable upon a first release of the main clutch with the power off to block any subsequent operation of the said program clutch control plate as would be effected through a subsequent operation of the vertical total program lever, and means operable upon any operation of the main clutch following a subsequent reestablishment of the power circuit whereby to release the said latch means from said control train and to restore the said clutch plate to normal relatched condition therewith.

References Cited in the file of this patent

UNITED STATES PATENTS

| | | |
|---|---|---|
| 1,854,875 | White | Apr. 19, 1932 |
| 2,756,926 | Dodsworth | July 31, 1956 |

UNITED STATES PATENT OFFICE
CERTIFICATE OF CORRECTION

Patent No. 3,072,329                              January 8, 1963

James W. Dodsworth

It is hereby certified that error appears in the above numbered patent requiring correction and that the said Letters Patent should read as corrected below.

Column 4, line 24, for "within" read -- with --; column 5, line 42, for "of" read -- to --; column 8, line 75, for "286'" read -- 386' --; columnn 9, line 42, for "full" read -- fully --; column 10, line 64, for "clutuch" read -- clutch --; line 65, after "keys" strike out the comma; column 12, line 40, for "therefor" read -- therefore --; column 13, line 21, for "wile" read -- while --; line 42, for "cltuch" read -- clutch --; column 15, line 15, for "therefore" read -- therefor --; line 69, for "shaft" read -- shift --; column 16, line 39, for "therefore" read -- therefor --; column 18, line 42, for "repopen" read -- reopen --; line 52, for "device" read -- devices --; same column, line 68, for "valve" read -- value --; column 20, line 1, after "said" insert -- lever and said --; lines 6 and 7, strike out "upon operable".

Signed and sealed this 12th day of November 1963.

(SEAL)
Attest:

ERNEST W. SWIDER                                  EDWIN L. REYNOLDS
Attesting Officer                           Acting Commissioner of Patents